(12) United States Patent
Shi et al.

(10) Patent No.: US 12,556,356 B2
(45) Date of Patent: Feb. 17, 2026

(54) CLOCK DETERMINING METHOD AND RELATED APPARATUS

(71) Applicant: HUAWEI TECHNOLOGIES CO., LTD., Shenzhen (CN)

(72) Inventors: Xingjian Shi, Shanghai (CN); Tao He, Dongguan (CN); Hao Li, Dongguan (CN); Xiaoyi Zeng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 651 days.

(21) Appl. No.: 17/964,619

(22) Filed: Oct. 12, 2022

(65) Prior Publication Data

US 2023/0050042 A1 Feb. 16, 2023

Related U.S. Application Data

(63) Continuation of application No. PCT/CN2021/086705, filed on Apr. 12, 2021.

(30) Foreign Application Priority Data

Apr. 13, 2020 (CN) .......................... 202010286753.9
Jun. 24, 2020 (CN) .......................... 202010586995.X (51) Int. Cl.
*H04L 7/00* (2006.01)
*H04J 3/06* (2006.01)

(52) U.S. Cl.
CPC .......... *H04L 7/0008* (2013.01); *H04J 3/0661* (2013.01); *H04L 7/0016* (2013.01)

(58) Field of Classification Search
CPC .......... H04J 3/0661; H04J 3/0667; H04J 3/14; H04L 43/0852; H04L 43/106; H04L 7/0008; H04L 7/0016
See application file for complete search history.

(56) References Cited

U.S. PATENT DOCUMENTS 6,993,469 B1 *  1/2006  Bortfeld .................. G06F 30/33
                                                    703/22
8,559,412 B1 * 10/2013  Nicholls ............... H04J 3/0673
                                                    370/350

(Continued)

FOREIGN PATENT DOCUMENTS

CN  103873179 A  6/2014
CN  108023723 A  5/2018
CN  108401454 A  8/2018

OTHER PUBLICATIONS

"IEEE Standard for a Precision Clock Synchronization Protocol for Networked Measurement and Control Systems," EEE Instrumentation and Measurement Society, IEEE Std 1588-2008, (Revision of IEEE Std 1588-2002), Total 289 pages, Institute of Electrical Electronics Engineers, New York, New York (Jul. 24, 2008).

(Continued)

*Primary Examiner* — Dung B Huynh
(74) *Attorney, Agent, or Firm* — Leydig, Voit & Mayer, Ltd.

(57) ABSTRACT

A clock determining method includes: when both a second network device and a first network device are synchronous with a reference clock, simulating, by using delay information between the second network device and the first network device and clock frequency information of the second network device, a second virtual clock synchronized with a first virtual clock, where the first virtual clock is used to simulate a clock of the first network device. A clock of the second network device can thus be simulated to perform a subsequent operation by using the simulated clock. For example, the simulated clock may be used to estimate precision time protocol (PTP) message synchronization performance of the second network device. Therefore, the PTP message synchronization performance of the second network device may be pre-determined before a global navi- (Continued)

gation satellite system (GNSS) fails, to guide network operation and maintenance activities.

20 Claims, 5 Drawing Sheets (56) References Cited

U.S. PATENT DOCUMENTS

| | | | | |
|---|---|---|---|---|
| 8,819,161 B1* | 8/2014 | Pannell | H04J 3/0697 |
| | | | | 709/208 |
| 9,459,652 B1* | 10/2016 | Landers | G06F 1/12 |
| 10,505,705 B1* | 12/2019 | Chen | H04L 7/0331 |
| 10,679,673 B2* | 6/2020 | Møller | H04N 21/8547 |
| 11,115,142 B1* | 9/2021 | Ozarkar | H04L 43/106 |
| 11,606,156 B1* | 3/2023 | Duda | H04J 3/0697 |
| 2003/0048811 A1* | 3/2003 | Robie, Jr. | H04J 3/0667 |
| | | | | 370/516 |
| 2004/0190544 A1* | 9/2004 | Azenko | H04L 43/18 |
| | | | | 370/252 |
| 2005/0264696 A1* | 12/2005 | Ozawa | G09G 5/008 |
| | | | | 348/E9.029 |
| 2007/0071080 A1* | 3/2007 | Sartschev | G01R 31/31932 |
| | | | | 375/224 |
| 2007/0121661 A1* | 5/2007 | Ohta | H04N 21/4363 |
| | | | | 370/412 |
| 2008/0089363 A1* | 4/2008 | Paulitsch | H04J 3/0685 |
| | | | | 370/503 |
| 2009/0147806 A1* | 6/2009 | Brueckheimer | H04J 3/0667 |
| | | | | 370/503 |
| 2010/0150288 A1* | 6/2010 | Zhu | H03L 7/22 |
| | | | | 375/356 |
| 2010/0158183 A1* | 6/2010 | Hadzic | H03L 7/087 |
| | | | | 375/376 |
| 2013/0034197 A1* | 2/2013 | Aweya | H03L 7/0991 |
| | | | | 375/362 |
| 2013/0080817 A1* | 3/2013 | Mihelic | H04L 43/0852 |
| | | | | 713/401 |
| 2013/0170507 A1* | 7/2013 | Hsueh | H04L 63/04 |
| | | | | 370/503 |
| 2013/0182806 A1* | 7/2013 | Obradovic | H04L 7/04 |
| | | | | 375/356 |
| 2013/0195233 A1* | 8/2013 | Amichai | H04L 7/0012 |
| | | | | 375/354 |
| 2013/0223458 A1* | 8/2013 | Bui | H04J 3/0667 |
| | | | | 370/503 |
| 2014/0029633 A1* | 1/2014 | Hamamatsu | H04J 3/0667 |
| | | | | 370/509 |
| 2014/0270805 A1* | 9/2014 | Mani | H04J 3/0667 |
| | | | | 398/155 |
| 2014/0334582 A1* | 11/2014 | Bock | G06F 1/12 |
| | | | | 375/356 |
| 2015/0092793 A1* | 4/2015 | Aweya | H04J 3/0667 |
| | | | | 370/503 |
| 2015/0092796 A1* | 4/2015 | Aweya | H04J 3/0667 |
| | | | | 370/516 |
| 2015/0163000 A1* | 6/2015 | Aweya | H04J 3/0667 |
| | | | | 370/503 |
| 2015/0163003 A1* | 6/2015 | Takahashi | H04N 21/242 |
| | | | | 370/509 |
| 2016/0094270 A1* | 3/2016 | Seller | H04J 3/0608 |
| | | | | 375/139 |
| 2016/0112974 A1* | 4/2016 | Shenoi | H04J 3/065 |
| | | | | 370/350 |
| 2016/0249310 A1* | 8/2016 | Buhl | H04W 56/0015 |
| 2016/0285574 A1* | 9/2016 | White | H04L 69/18 |
| 2016/0330707 A1* | 11/2016 | Das | H04W 72/0453 |
| 2017/0078990 A1* | 3/2017 | Chu | H04L 5/0048 |
| 2017/0251418 A1* | 8/2017 | Aweya | H04L 43/08 |
| 2017/0288801 A1* | 10/2017 | Aweya | H04J 3/0661 |
| 2018/0139034 A1* | 5/2018 | DeCorte | H04L 69/00 |
| 2018/0152281 A1* | 5/2018 | Zigelboim | H04L 43/106 |
| 2018/0198599 A1 | 7/2018 | Mihelic | |
| 2019/0018910 A1* | 1/2019 | Xiang | G06F 30/396 |
| 2019/0058459 A1* | 2/2019 | Khan | H03J 1/0025 |
| 2019/0089716 A1* | 3/2019 | Stöcker | H04L 67/125 |
| 2019/0123843 A1* | 4/2019 | Bush | H04J 3/0697 |
| 2019/0138047 A1* | 5/2019 | El Kolli | G06F 1/12 |
| 2019/0260490 A1* | 8/2019 | Lv | H04J 3/067 |
| 2019/0339328 A1* | 11/2019 | Xiang | G01R 31/318328 |
| 2020/0053678 A1* | 2/2020 | Moon | H04W 76/22 |
| 2020/0097626 A1* | 3/2020 | Sodagam | G06F 30/3308 |
| 2020/0145181 A1* | 5/2020 | Kim | H04L 7/0037 |
| 2020/0153625 A1* | 5/2020 | Schaap | H04L 9/0869 |
| 2020/0160147 A1* | 5/2020 | Bandyopadhyay | G06N 7/08 |
| 2020/0228304 A1* | 7/2020 | Akondy Raja Raghupathi | |
| | | | H04L 7/0331 |
| 2020/0304224 A1* | 9/2020 | Neugeboren | G06F 1/12 |
| 2020/0336426 A1* | 10/2020 | Tadimeti | H04L 43/0852 |
| 2020/0356931 A1* | 11/2020 | Ebata | G06Q 10/067 |
| 2020/0396051 A1* | 12/2020 | Geng | G06F 1/14 |
| 2021/0058181 A1* | 2/2021 | Dwivedi | H04J 3/0667 |
| 2021/0067313 A1* | 3/2021 | Yu | H04J 3/0685 |
| 2021/0091919 A1* | 3/2021 | Geng | H04L 7/0008 |
| 2021/0203428 A1* | 7/2021 | Bordogna | H04J 3/0697 |
| 2021/0203666 A1* | 7/2021 | Woodland | H04L 63/108 |
| 2021/0288736 A1* | 9/2021 | Guignard | H04J 3/0667 |
| 2021/0382520 A1* | 12/2021 | Margalit | H04J 3/0685 |
| 2022/0095262 A1* | 3/2022 | Kazaz | G01S 13/84 |
| 2022/0303109 A1* | 9/2022 | Zheng | H04B 1/40 |
| 2022/0369258 A1* | 11/2022 | Wang | H04W 56/001 |
| 2023/0050042 A1* | 2/2023 | Shi | H04L 7/0016 |
| 2023/0300056 A1* | 9/2023 | Bandemer | G06F 9/5077 |
| | | | | 709/224 |
| 2024/0031049 A1* | 1/2024 | Liu | H04W 56/0015 |
| 2024/0137201 A1* | 4/2024 | Shao | H04L 7/04 |
| 2024/0311673 A1* | 9/2024 | Salim | G06N 3/09 |

OTHER PUBLICATIONS

"IEEE Standard for a Precision Clock Synchronization Protocol for Networked Measurement and Control Systems," IEEE Instrumentation and Measurement Society, IEEE Std 1588-2002, Total 154 pages, Institute of Electrical Electronics Engineers, New York, New York (Nov. 8, 2022).

Series G: Transmission Systems and Media, Digital Systems and Networks, Packet over Transport aspects Synchronization, quality and availability targets, Series Y: Global Information Infrastructure, Internet Protocol Aspects, Next-Generation Networks, Internet of Things and Smart Cities , Internet protocol aspects-Transport, ITU-T G.8275.1/Y.1369.1, Total 62 pages, International Union of Telecommunication, Geneva, Switzerland (Mar. 2020).

Allard et al., "Fully Distributed Clock Synchronization in Wide-Range TDMA Ad-Hoc Networks," The 2011 Military Communications Conference—Track 2—Network Protocols and Performance, XP032093064, pp. 920-925, Institute of Electrical and Electronics Engineers, New York, New York (Nov. 7, 2011).

* cited by examiner

CLOCK DETERMINING METHOD AND RELATED APPARATUS

CROSS-REFERENCE TO RELATED APPLICATIONS

This application is a continuation of International Application No. PCT/CN2021/086705, filed on Apr. 12, 2021, which claims priority to Chinese Patent Application No. 202010286753.9, filed on Apr. 13, 2020 and Chinese Patent Application No. 202010586995.X, filed on Jun. 24, 2020. All of the aforementioned applications are hereby incorporated by reference in their entireties.

TECHNICAL FIELD

This application relates to the field of communication technologies, and more specifically, to a clock determining method and a related apparatus.

BACKGROUND

In modern communication networks, normal operation of most teleservices requires that frequencies of or time differences between all network devices are kept within a proper error level, that is, network clocks are synchronized. Frequencies of different network devices need to be synchronized within specific precision. Otherwise, a service abnormality, for example, a code slip or a disconnection, may occur when an access network device or a terminal device processes a service. In addition, some wireless standards require both frequency synchronization and phase synchronization.

A $5^{th}$ generation (5G) communication network is used as an example. A time error between access network devices in the 5G network needs to be less than 3 microseconds (μs), and synchronization precision between a network device and a network clock time server needs to be less than 1.5 μs.

An assisted partial timing support (APTS) function provides synchronization precision by using a global navigation satellite system (GNSS). An APTS solution is to deploy a GNSS apparatus (for example, a global positioning system (GPS) receiver or a Beidou receiver) in the network device. When the GNSS apparatus is normal, the network device tracks clock time information of the GNSS apparatus. When a problem occurs in the GNSS apparatus (for example, a physical fault of the GNSS apparatus, or interference to, spoofing of, or a loss of a GNSS signal), a clock time is synchronized and switched to a terrestrial communication network. For example, frequency or phase synchronization is implemented by using a precision time protocol (PTP) message. For another example, the clock time is synchronized to an upstream clock source device of a network by adaptive clock recovery (ACR)/adaptive time recovery (ATR).

Currently, a manner of evaluating message synchronization performance includes performing simulation analysis on synchronization performance by using forward and reverse delay data collected by a download device, or importing the forward and reverse delay data to a test meter for performance test. These two methods need investment of operation and maintenance personnel or a professional technician and a special test meter, and an evaluation result cannot be obtained quickly. Manpower, material, and time costs are high.

SUMMARY

This application provides a clock determining method and a related apparatus, which can simulate a clock of a network device.

According to a first aspect, an embodiment of this application provides a clock determining method, including: when both a second network device and a first network device are synchronous with a reference clock, obtaining delay information between the second network device and the first network device and clock frequency information of the second network device; determining a second virtual clock based on the frequency information; and adjusting the second virtual clock based on the delay information, where an adjusted second virtual clock is synchronized with a first virtual clock, and the first virtual clock is used to simulate a clock of the first network device. In the foregoing technical solution, a clock of the second network device can be simulated, to perform a subsequent operation by using the simulated clock. For example, the simulated clock may be used to estimate PTP message synchronization performance of the second network device. Therefore, the PTP message synchronization performance of the second network device may be pre-determined before a GNSS fails, to guide network operation and maintenance activities.

In an example embodiment, the delay information includes N delays, and the N delays are N delays from the second network device to the first network device, or N delays from the first network device to the second network device, where N is a positive integer greater than or equal to 2. The method further includes: obtaining N first timestamps generated by the first virtual clock. The adjusting the second virtual clock based on the delay information includes: obtaining, based on the N delays and the N first timestamps, N second timestamps generated by the second virtual clock, where the N second timestamps are in a one-to-one correspondence with the N delays; and adjusting a frequency of the second virtual clock based on the N second timestamps and the N first timestamps. By using the foregoing technical solutions, a frequency of the simulated clock of the second network device can be synchronized with a frequency of a virtual clock of the first network device.

In an example embodiment, the obtaining, based on the N delays and the N first timestamps, N second timestamps generated by the second virtual clock includes: by taking an $n^{th}$ timestamp in the N first timestamps as a starting moment, after an $n^{th}$ delay in the N delays, determining that a timestamp of the second virtual clock is an $n^{th}$ second timestamp in the N second timestamps, where n=1, . . . , or N.

In an example embodiment, the delay information includes a forward delay and a reverse delay, where the forward delay is a delay from the first network device to the second network device, and the reverse delay is a delay from the second network device to the first network device. The method further includes: obtaining a third timestamp and a sixth timestamp generated by the first virtual clock; obtaining a fourth timestamp and a fifth timestamp generated by the second virtual clock. The adjusting the second virtual clock based on the delay information includes: determining a first delay based on the forward delay, the third timestamp, and the fourth timestamp; determining a second delay based on the reverse delay, the fifth timestamp, and the sixth timestamp; and adjusting a phase of the second virtual clock based on the first delay and the second delay. By using the foregoing technical solutions, a phase of the simulated clock of the second network device can be synchronized with a phase of the virtual clock of the first network device.

In an example embodiment, the determining a first delay based on the forward delay, the third timestamp, and the fourth timestamp includes: determining the first delay according to the following formula:

$D_1=D_f+(T_4-T_3)$, where $D_1$ is the first delay, $D_f$ is the forward delay, $T_3$ is the third timestamp, and $T_4$ is the fourth timestamp.

The determining a second delay based on the reverse delay, the fifth timestamp, and the sixth timestamp includes: determining the second delay according to the following formula:

$D_2=D_b+(T_6-T_5)$, where $D_2$ is the second delay, $D_b$ is the reverse delay, $T_5$ is the fifth timestamp, and $T_6$ is the sixth timestamp.

In an example embodiment, the delay information includes a seventh timestamp, an eighth timestamp, a ninth timestamp, and a tenth timestamp. The adjusting the second virtual clock based on the delay information includes: adjusting the eighth timestamp and the ninth timestamp based on the frequency information; and adjusting a phase of the second virtual clock based on the seventh timestamp, an adjusted eighth timestamp, an adjusted ninth timestamp, and the tenth timestamp. By using the foregoing technical solution, the phase of the simulated clock of the second network device can be synchronized with the phase of the virtual clock of the first network device.

In an example embodiment, the method further includes: determining clock performance evaluation information based on the first virtual clock and the adjusted second virtual clock, where the clock performance evaluation information is used to indicate clock time recovery performance of the second virtual clock. In the foregoing technical solution, information used to evaluate the clock time recovery performance of the second virtual clock can be obtained by using the second virtual clock, so that the clock time recovery performance of the second virtual clock can be evaluated by using the obtained information, to guide network operation and maintenance activities.

In an example embodiment, the determining clock performance evaluation information based on the first virtual clock and the adjusted second virtual clock includes: determining a frequency $F_{v1}$ of the first virtual clock and a frequency $F_{v2}$ of the adjusted second virtual clock; and determining a time interval error TIE based on $F_{v1}$ and $F_{v2}$. In the foregoing technical solutions, frequency recovery performance of the second virtual clock can be obtained.

In an example embodiment, the determining clock performance evaluation information based on the first virtual clock and the adjusted second virtual clock includes: determining timestamps $T_{v1}$ and $T_{v4}$ generated by the first virtual clock; determining timestamps $T_{v2}$ and $T_{v3}$ generated by the adjusted second virtual clock; and determining a time error TE based on $T_{v1}$, $T_{v2}$, $T_{v3}$, and $T_{v4}$. In the foregoing technical solution, phase recovery performance of the second virtual clock can be obtained.

According to a second aspect, an embodiment of this application provides an electronic device. The electronic device includes a unit configured to implement any one of the first aspect or the example embodiments of the first aspect.

According to a third aspect, an embodiment of this application provides an electronic device, including a processor, where the processor is configured to couple to a memory, and read and execute instructions and/or program code in the memory, to perform the method according to any one of the first aspect or the example embodiments of the first aspect.

According to a fourth aspect, an embodiment of this application provides a system on chip, including a logic circuit, where the logic circuit is configured to couple to an input/output interface, and transmit data through the input/output interface, to perform the method according to any one of the first aspect or the example embodiments of the first aspect.

According to a fifth aspect, an embodiment of this application provides a computer-readable storage medium, where the computer-readable medium stores program code. When the computer program code is run on a computer, the computer is enabled to perform the method according to any one of the first aspect or the example embodiments of the first aspect.

DESCRIPTION OF EMBODIMENTS

The following describes technical solutions of this application with reference to accompanying drawings.

Technical solutions of embodiments of this application may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5$^{th}$ generation (5G) system, or a new radio (NR) system.

To facilitate a person skilled in the art to better understand technical solutions of this application, some concepts related to technical solutions of this application are first briefly described.

1. Clock Synchronization

Clock synchronization includes two concepts: phase synchronization and frequency synchronization.

Frequency synchronization may also be referred to as clock synchronization, which means that a strict specific relationship is maintained between frequencies or phases of signals, and the signals appear at a same average rate at an effective moment corresponding the signals, to maintain that all devices in a communication network operate at a same rate, that is, a constant phase difference is maintained between the signals.

Phase synchronization may also be referred to as time synchronization, which means that both frequencies and phases of signals are consistent, that is, a phase difference between the signals is always zero.

2. 1588

1588 is defined by the Institute of Electrical and Electronics Engineers (IEEE).

The 1588v1 version was released in 2002, and is mainly used in the industrial automation and test measurement fields. In the telecommunications field, with development of an Internet protocol (IP) network and rise of the $3^{rd}$ generation (3G) communication technology, a telecommunication network has an increasingly strong requirement for time synchronization. The IEEE organization revises the 1588v1. A first draft of IEEE 1588v2 was exported in June 2006 and revised in 2007, and the IEEE 1588v2 standard was released at the end of 2008.

The full name of 1588v2 is a precision clock synchronization protocol for networked measurement and control systems, which is simply referred to as a precision time protocol (PTP). 1588v2 is originally used only for high-precision time synchronization between devices, but can also be used to implement clock synchronization or time synchronization between devices.

3. ITU-T G.8275.1

The International Telecommunication Union Telecommunication Standardization Sector (International Telecommunication Union Telecommunication Standardization Sector, ITU-T) defines a precision time protocol telecom profile for phase/time synchronization with full timing support from the network.

The ITU-T G.8275.1 protocol defines three basic clock node types: a telecom grandmaster (T-GM), a telecom boundary clock (T-BC), and a telecom time slave clock (T-TSC).

The T-GM can only be a master device, and provide a synchronous clock source.

The T-BC may have a plurality of clock ports. A slave port may be configured to synchronize clock information of an upstream device, and a master port may send the clock information to a downstream device.

The T-TSC can only be used as a slave device, to synchronize the clock information of the upstream device.

4. Grandmaster Clock, and Master Device/Slave Device

A time synchronization network may be considered as a spanning tree, and a master clock is a root node of the tree. Time of all nodes in the network is synchronized with the master clock.

For a pair of nodes performing time synchronization, an upstream node sending synchronization time is referred to as a master device, and a downstream node receiving the synchronization time is referred to as a slave device.

A network device in the embodiments of this application is a network device that can provide a clock for an access network device, a baseband control unit (BBU), and a remote radio unit (RRU), for example, the clock may be a T-GM, a T-BC, or a T-TSC.

5. 1588 ACR (PTP ACR)

A 1588 ACR network architecture mainly includes three parts: a 1588 ACR master device, namely, a packet master clock); a 1588 ACR slave device, namely, a packet slave clock; and a message network in the middle, namely, a packet network. The 1588 ACR master device transmits a clock (frequency) signal to the 1588 ACR slave device by using a 1588 message through an intermediate network. The 1588 ACR slave device recovers a frequency of the 1588 ACR master device based on a timestamp carried in the message. A clock source of the 1588 ACR master device may be from a GNSS, may be from a building integrated timing supply system (BITS), or may be from another synchronous digital hierarchy (SDH) synchronization network or synchronization Ethernet (SyncE). The 1588 ACR slave device recovers a clock of the 1588 ACR master device based on a 1588v2 message, to implement frequency synchronization with the 1588 ACR master device. When forwarding a 1588v2 message of the 1588 ACR master device, the intermediate network causes a delay and delay jitter. This is equivalent to that when the 1588 ACR slave device receives the message, a noise is superposed on a timestamp of the 1588 ACR master device. Consequently, clock performance recovered by the 1588 ACR slave device is affected. Different network loads and different forwarding paths cause different noises, and performance recovered by the 1588 ACR slave device is usually different.

6. 1588 ATR (PTP ATR)

The 1588 ATR is an adaptive time synchronization scheme that is mainly applied to a scenario in which 1588V2 hop-by-hop time synchronization is not supported by a network traversing in the middle. On a premise of frequency synchronization (the frequency synchronization may be SyncE frequency synchronization or 1588 ACR frequency synchronization), a 1588 ATR slave device calculates a time deviation between a master device and a slave device based on a timestamp carried in a message, and adjusts a real-time clock (RTC) of the slave device, to implement time synchronization between the slave device and the master device. Time synchronization performance is affected by a packet delay variation (PDV) introduced by factors such as traffic load of the network traversing in the middle and a forwarding path.

An access network device in the embodiments of this application may be a device used to communicate with a terminal device. The access network device may be a base transceiver station (BTS) in a global system of mobile communication (GSM) or a code division multiple access (CDMA) system, may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the access network device may be a relay station, an access point, a vehicle-mounted device, a wearable device, a network device in a future 5G network, a network device in a future evolved PLMN, or the like. This is not limited in this embodiment of this application.

Figure 1:
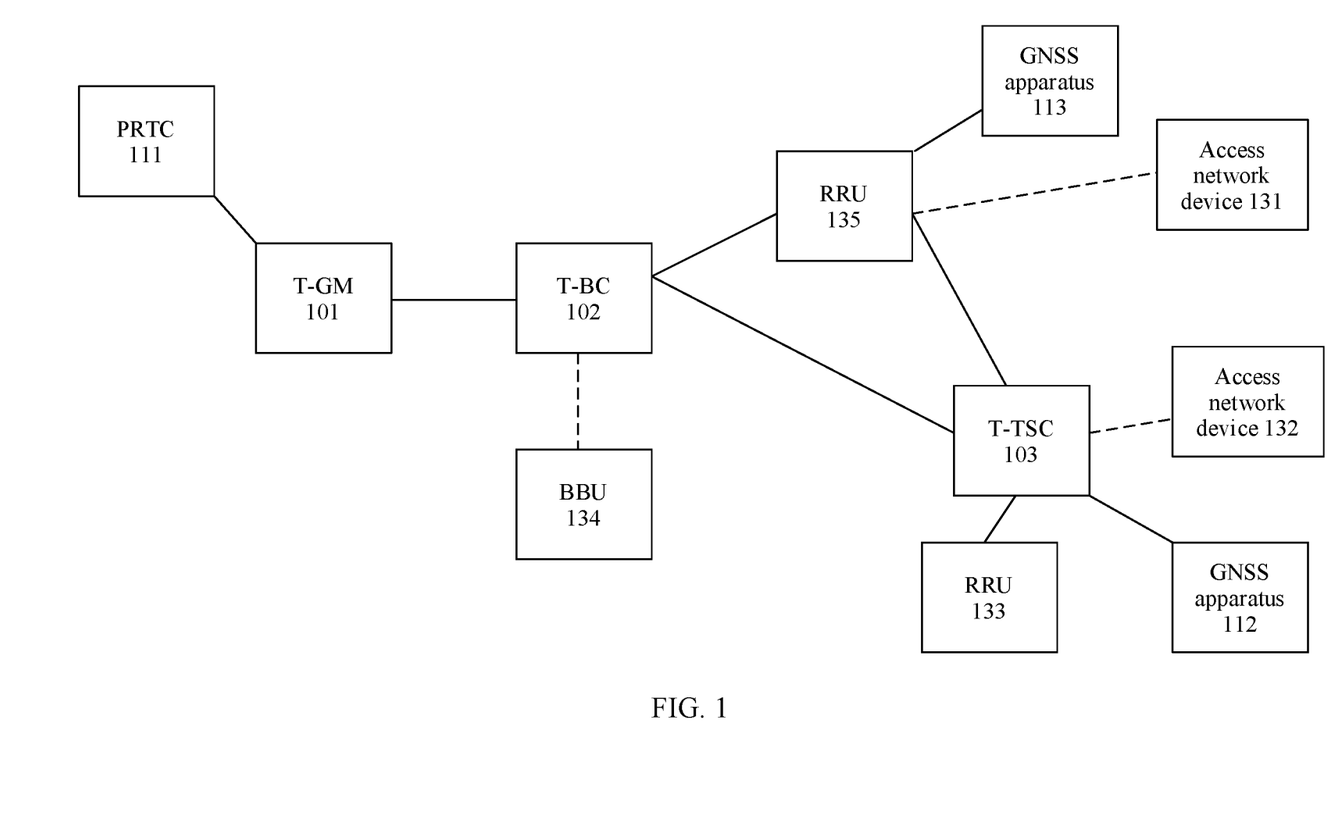
FIG. 1 is a schematic diagram of a system to which a technical solution of this application is applied.

FIG. 1 is a schematic diagram of a system to which a technical solution of this application is applied. The system shown in FIG. 1 includes a T-GM 101, a T-BC 102, and a T-TSC 103.

A reference clock of the T-GM 101 is a primary reference time clock (PRTC) 111. In other words, the T-GM 101 is synchronized with the PRTC 111.

A reference clock of the T-TSC 103 is a clock obtained by a GNSS apparatus 112. The T-TSC 103 is synchronized with the clock obtained by the GNSS apparatus 112. The T-TSC 103 may provide a clock for an access network device 132 and an RRU 133.

A reference clock of the T-BC 102 is a clock obtained by a GNSS apparatus 113. The T-BC 102 is synchronized with the clock obtained by the GNSS apparatus 113. The clock obtained by the T-BC 102 from the GNSS 113 is obtained by using an RRU 135. Clock time information collected by the GNSS apparatus 113 may be sent to the T-BC 102 by using the RRU 135. The T-BC 102 may provide the clock for a BBU 134.

The clock time information received by the RRU 135 from the GNSS apparatus 113 may be used as a clock of an access network device 131.

The GNSS apparatus 112 and the GNSS apparatus 113 may collect clock time information based on different GNSSs. For example, the GNSS apparatus 112 collects the clock time information by using the Beidou, and the GNSS apparatus 113 collects the clock time information by using a GPS. In another example, the GNSS apparatus 112 collects the clock time information by using a GPS, and the GNSS apparatus 113 collects the clock time information by using a Galileo satellite navigation system.

Certainly, the GNSS apparatus 113 and the GNSS apparatus 112 may alternatively collect clock time information based on a same GNSS. For example, both the GNSS apparatus 112 and the GNSS apparatus 113 may collect the clock time information by using the Beidou. In another example, both the GNSS apparatus 112 and the GNSS apparatus 113 may collect the clock time information by using a GPS.

For ease of description, each network device in FIG. 1 provides a clock for only one access network device, one BBU, or one RRU. However, each network device can provide a clock for a plurality of access network devices, a plurality of BBUs, and/or a plurality of RRUs.

Figure 2:
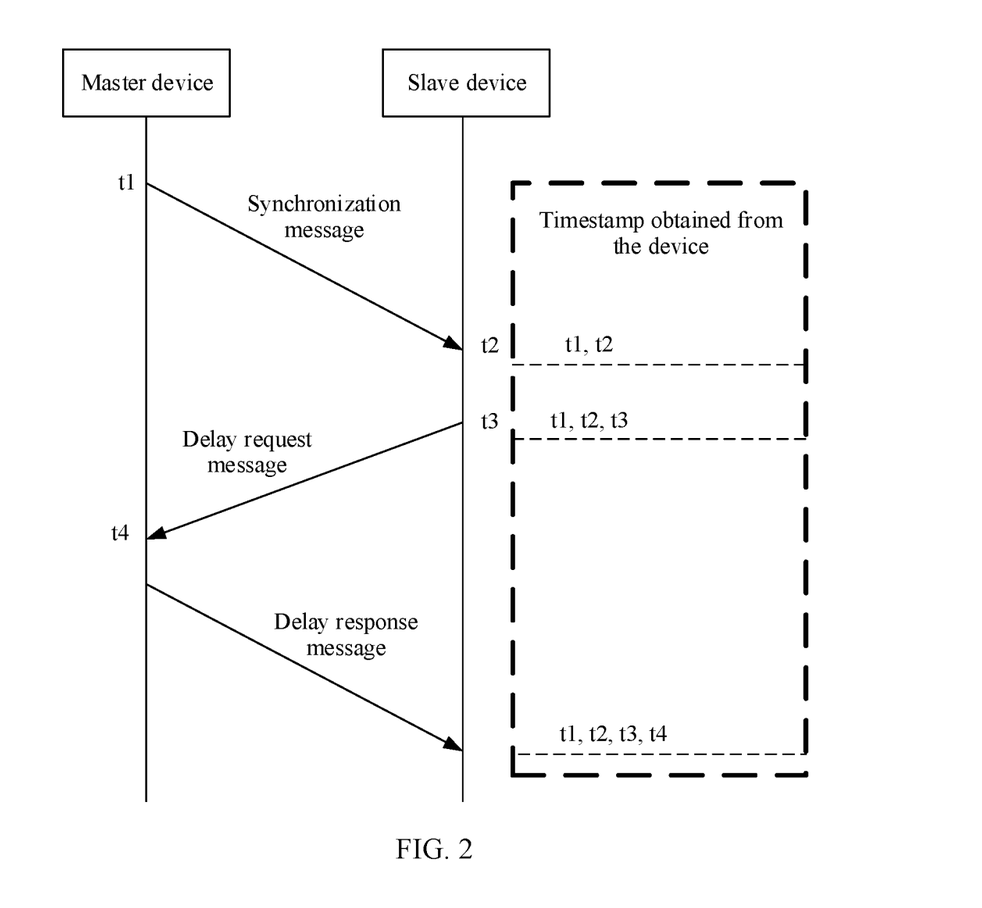
FIG. 2 is a schematic diagram of a principle of message time synchronization.

FIG. 2 is a schematic diagram of a principle of message time synchronization. As shown in FIG. 2, a master device sends a synchronization message (Sync message) to a slave device at a moment t1. The synchronization message carries a timestamp t1.

The slave device receives the synchronization message at a moment t2, and locally generates a timestamp t2. In other words, the slave device locally generates the timestamp t2 at a moment of receiving the synchronization message. The slave device further extracts the timestamp t1 from the synchronization message.

The slave device sends a delay request (Delay_Request, Delay_Req) message to the master device at a moment t3, and locally generates a timestamp t3.

The master device receives the delay request message at a moment t4, locally generates a timestamp t4, then, adds the timestamp t4 to a delay response (Delay_Response, Delay_Resp) message, and sends the delay response message to the slave device.

After receiving the delay response message, the slave device extracts the timestamp t4 from the delay response message.

The slave device may calculate a time deviation between the slave device and the master device by using the four timestamps t1, t2, t3, and t4, thereby adjusting time of the slave device to implement time synchronization with the master device.

Specifically, it is assumed that a message path delay from the master device to the slave device is denoted as $D_{S1}$, a message path delay from the slave device to the master device is denoted as $D_{S2}$, a time deviation between the slave device and the master device is denoted as Offset. Then, $D_{S1}$, $D_{S2}$, Offset, t1, t2, t3, and t4 have the following relationships:

$$t2-t1=D_{S1}+\text{Offset}, \quad \text{(Formula 2.1)}$$

$$t4-t3=D_{S2}-\text{Offset}, \quad \text{(Formula 2.2)}$$

It may be learned from the 1588V2 protocol that, it may be assumed that $D_{S1}=D_{S2}$, and then Offset may be calculated by using the following formula:

$$\text{Offset}=[(t2-t1)-(t4-t3)]/2, \quad \text{(Formula 2.3)}$$

t2−t1 may be referred to as a forward delay, and t4−t3 may be referred to as a reverse delay.

Figure 3:
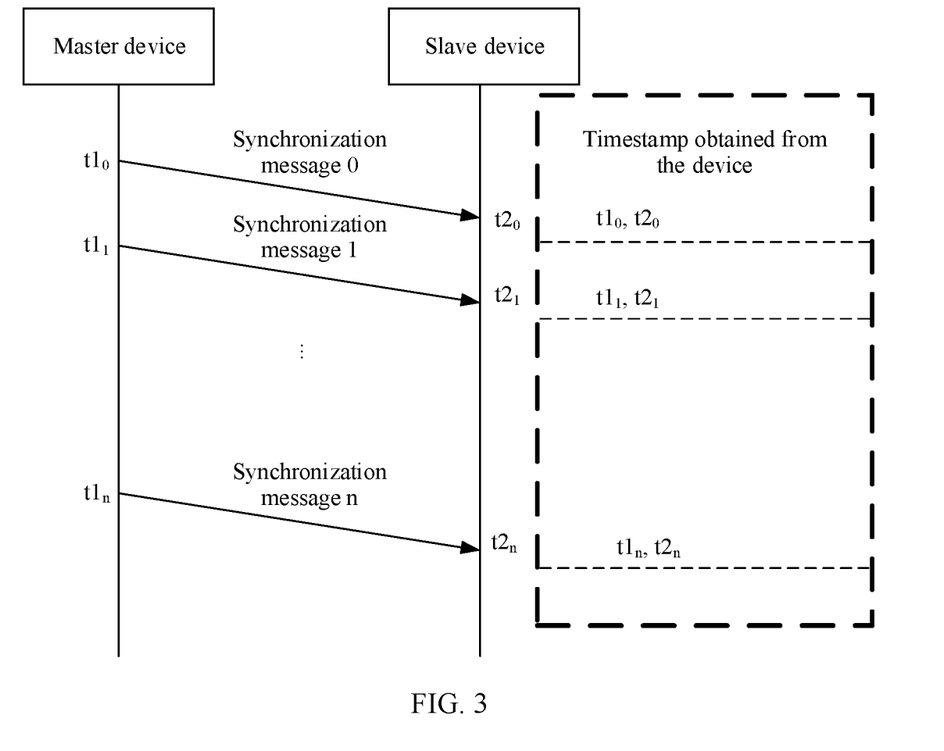
FIG. 3 is a schematic diagram of a frequency synchronization process.

FIG. 3 is a schematic diagram of a frequency synchronization process. As shown in FIG. 3, frequency synchronization is implemented between the master device and the slave device by using a synchronization message.

As shown in FIG. 3, the master device periodically sends a synchronization message to the slave device. The synchronization message carries a timestamp of a sending time. After receiving the synchronization message, the slave device generates a local timestamp and extracts the timestamp from the synchronization message.

For example, the master device sends a synchronization message 0 to the slave device at a moment $t1_0$. The slave device receives the synchronization message 0 at a moment $t2_0$, generates a local timestamp $t2_0$, and extracts the timestamp $t1_0$ from the synchronization message 0. The master device sends a synchronization message 1 to the slave device at a moment $t1_1$. The slave device receives the synchronization message 1 at a moment $t2_1$, generates a local timestamp $t2_1$, extracts the timestamp $t1_1$ from the synchronization message 1, and so on.

The master device periodically sends the synchronization message to the slave device. Regardless of a change of a path delay, if a frequency of the slave device is synchronous with a frequency of the master device, an accumulated time deviation of the master device is the same as that of the slave device in a same time interval, that is, $$t2_1-t2_0=t1_1-t1_0, t2_2-t2_1=t1_2-t1_1, t2_3-t2_2=t1_3-t1_2, \ldots, \text{ and } t2_n-t2_{n-1}=t1_n-t1_{n-1}.$$

If $t2_n-t2_{n-1}$ is greater than $t1_n-t1_{n-1}$, which indicates that the frequency of the slave device is higher than that of the master device, the frequency of the slave device needs to be decreased. On the contrary, the frequency of the slave device needs to be increased. A specific adjustment manner may be performing adjustment by using a proportional-integral-derivative (PID) control principle.

Frequency synchronization may also be implemented by using t3 and t4. A principle is the same as that of t1 and t2 described herein. For brevity, details are not described herein.

As described above, the T-GM and T-BC may be used as master devices, and the T-BC and the T-TSC may be used as slave devices. For example, if the master device is a T-GM, the slave device may be a T-BC or a T-TSC. If the master device is a T-BC, the slave device may be a T-TSC.

Figure 4:
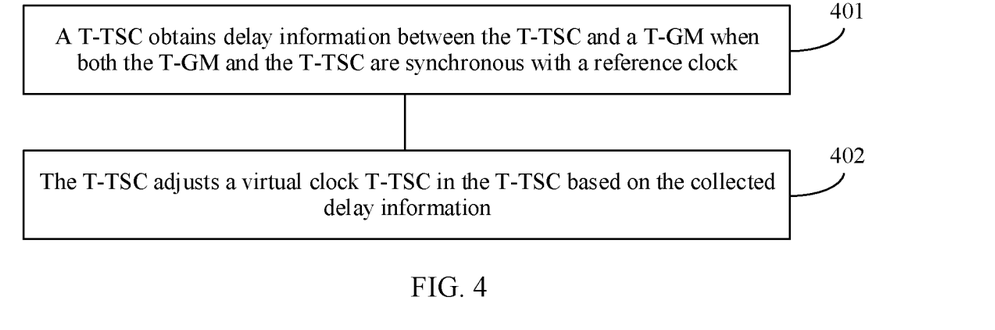
FIG. 4 is a schematic flowchart of a clock determining method according to an embodiment of this application.

FIG. 4 is a schematic flowchart of a clock determining method according to an embodiment of this application. The method shown in FIG. 4 may be performed by a network device serving as a slave device, or may be implemented by an apparatus (for example, a chip or a circuit) in a network device serving as a slave device. For ease of description, in the following embodiments, it is assumed that a T-GM is a network device serving as a master device, and a T-TSC is the network device serving as a slave device. For ease of description, the following uses the T-TSC as an execution body to describe solutions of this application.

Step 401: The T-TSC obtains delay information between the T-TSC and the T-GM when both the T-GM and the T-TSC are synchronous with a reference clock.

Step 402: The T-TSC adjusts a virtual clock T-TSC in the T-TSC based on the collected delay information, so that the virtual clock T-TSC is synchronized with a virtual clock T-GM. The virtual clock T-GM is used to simulate a clock of the T-GM.

The following describes step 401 and step 402 in detail.

Optionally, in some embodiments, the delay information obtained by the T-TSC may include a forward delay and a reverse delay. Specifically, the T-TSC may track a 1588 message between the T-GM and the T-TSC (for example, the synchronization message, the delay request message, and the delay response message shown in FIG. 2 and FIG. 3, which may also be referred to as a PTP message), obtain a timestamp, and determine the forward delay (namely, a delay from the T-GM to the T-TSC) and the reverse delay (namely, a delay from the T-TSC to the T-GM) based on the obtained timestamp.

The delay information recorded by the T-TSC may include a plurality of groups of information, and each group of information may include one forward delay and one reverse delay. For example, Table 1 shows a plurality of groups of information in the delay information collected by the T-TSC.

TABLE 1

| Serial number | Delay information | | Frequency information |
|---|---|---|---|
| | Forward delay | Reverse delay | |
| 1 | Forward delay 1 | Reverse delay 1 | Frequency information 1 |
| 2 | Forward delay 2 | Reverse delay 2 | Frequency information 2 |
| 3 | Forward delay 3 | Reverse delay 3 | Frequency information 3 |
| ... | ... | ... | ... |
| N | Forward delay N | Reverse delay N | Frequency information N |

As shown in Table 1, the T-TSC performs the process shown in FIG. 2 for N times in total, and collects N groups of information in the delay information. A first group of information in the delay information collected by the T-TSC includes the forward delay 1 and the reverse delay 1, a second group of information in the delay information includes the forward delay 2 and the reverse delay 2, and so on. For a manner of collecting the forward delay and the reverse delay by the T-TSC, reference may be made to the process shown in FIG. 2. For brevity, details are not described herein.

As shown in Table 1, in addition to the delay information, information collected by the T-TSC further includes frequency information. The frequency information is clock frequency information of the T-TSC. A specific function of the frequency information is described later.

Optionally, in some other embodiments, the T-TSC may use the obtained timestamp as the delay information. For example, Table 2 shows a plurality of groups of information in the delay information collected by the T-TSC.

TABLE 2

| Serial number | Delay information | | | | Frequency information |
|---|---|---|---|---|---|
| | T1 | T2 | T3 | T4 | |
| 1 | $T1_1$ | $T2_1$ | $T3_1$ | $T4_1$ | Frequency information 1 |
| 2 | $T1_2$ | $T2_2$ | $T3_2$ | $T4_2$ | Frequency information 2 |
| 3 | $T1_3$ | $T2_3$ | $T3_3$ | $T4_3$ | Frequency information 3 |
| ... | ... | ... | ... | ... | ... |
| N | $T1_N$ | $T2_N$ | $T3_N$ | $T4_N$ | Frequency information N |

As shown in Table 2, the T-TSC performs the process shown in FIG. 2 for N times in total, and collects N groups of information in the delay information. A first group of information in the delay information collected by the T-TSC includes $T1_1$, $T2_1$, $T3_1$, and $T4_1$. A second group of information in the delay information includes $T1_2$, $T2_2$, $T3_2$, and $T4_2$, and so on. For a manner of collecting the forward delay and the reverse delay by the T-TSC, reference may be made to the process shown in FIG. 2. For brevity, details are not described herein.

A clock of the T-TSC is synchronized with a GNSS. To distinguish the virtual clock in the T-TSC, a clock required for operating the T-TSC is referred to as an actual clock in the following. In other words, the actual clock of the T-TSC is synchronized with the GNSS. Because it is required to synchronize with the GNSS, the T-TSC needs to adjust a frequency of the actual clock by using a frequency control word, so that the actual clock is synchronized with the GNSS.

In some embodiments, the frequency information collected by the T-TSC may be a frequency control word. In some other embodiments, the frequency information collected by the T-TSC may alternatively be a clock source noise. Because the actual clock has a clock source noise, the frequency of the actual clock needs to be adjusted by using the frequency control word, so that the actual clock is synchronized with the GNSS. Therefore, the frequency control word and the clock source noise can correspond to each other.

As shown in Table 1 and Table 2, a group of information collected by the T-TSC may include the delay information and the frequency information. In other words, when collecting the delay information, the T-TSC may collect frequency information in this time period.

There may be two virtual clocks in the T-TSC, namely, the virtual clock T-TSC and the virtual clock T-GM.

The virtual clock may include a virtual direct digital synthesizer (DDS) and a virtual real-time clock (RTC). The virtual DDS generates a clock signal, and the virtual RTC generates time information (a timestamp) by using the clock signal generated by the virtual DDS as a working clock. A format of the time information generated by the virtual RTC is 48 bits per second (s) and 32 bits per nanosecond (ns). The time information may be converted into a second, minute, hour, day, month, year. However, for ease of description, the following represents the time information generated by the virtual RTC by using a second, minute, hour, day, month, year.

As described above, the virtual clock T-GM is used to virtualize the clock of the T-GM. The clock of the T-GM is synchronized with a PRTC. Therefore, the actual clock of the T-GM can be considered as an ideal clock. Therefore, a clock signal generated by the virtual clock T-GM may be an ideal clock signal.

A clock signal generated by the virtual clock T-TSC is determined based on the collected frequency information and the ideal clock signal. The clock signal generated by the virtual clock T-TSC is generated by superposing the clock source noise with the ideal clock signal. Therefore, as described above, if the frequency information collected by the T-TSC is a clock source noise, the T-TSC can directly use the clock source noise to determine the clock signal generated by the virtual clock T-TSC. If the frequency information collected by the T-TSC is the frequency control word, the frequency control word further needs to be converted into a clock source noise, and then the clock signal generated by the virtual T-TSC is determined based on the clock source noise.

The T-TSC may adjust the virtual clock T-TSC by using the collected delay information, a timestamp generated by the virtual clock T-GM, and a timestamp generated by the virtual clock T-TSC, so that the virtual clock T-TSC is synchronized with the virtual clock T-GM.

Figure 5:
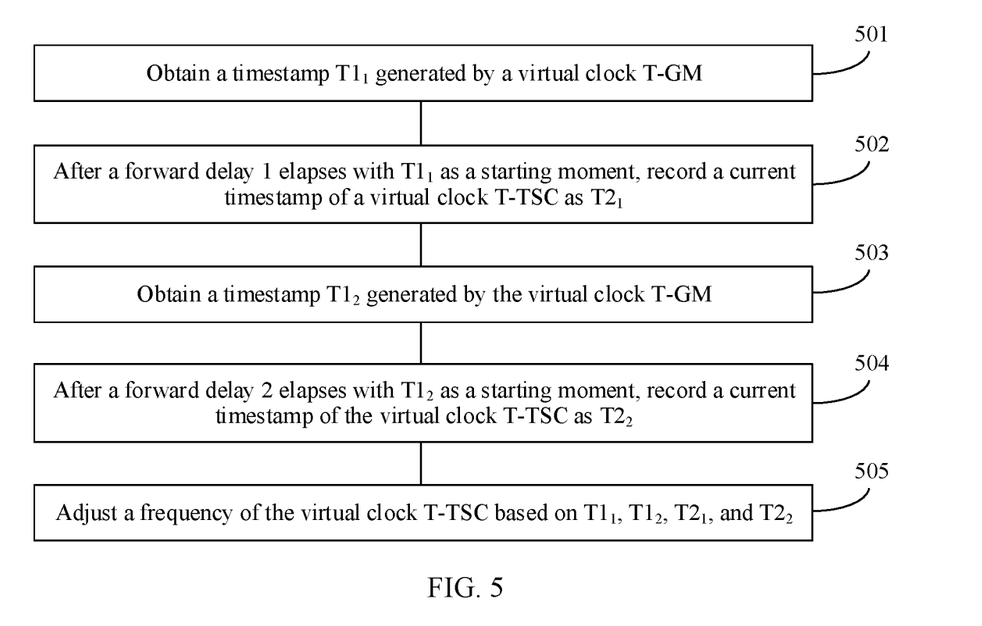
FIG. 5 is a schematic flowchart of adjusting a frequency of a virtual clock T-TSC according to an embodiment of this application.

The following briefly describes how to adjust a frequency of the virtual clock T-TSC with reference to FIG. 5.

FIG. 5 is a schematic flowchart of adjusting a frequency of a virtual clock T-TSC according to an embodiment of this application.

Step 501: Obtain a timestamp $T1_1$ generated by the virtual clock T-GM.

Step 502: After a forward delay 1 elapses with $T1_1$ as a starting moment, record a current timestamp of the virtual clock T-TSC as $T2_1$.

Step 503: Obtain a timestamp $T1_2$ generated by the virtual clock T-GM.

Step 504: After a forward delay 2 elapses with $T1_2$ as a starting moment, record a current timestamp of the virtual clock T-TSC as $T2_2$.

Step 505: Adjust the frequency of the virtual clock T-TSC based on $T1_1$, $T1_2$, $T2_1$, and $T2_2$.

If $T2_2-T2_1$ is greater than $T1_2-T1_1$, the frequency of the virtual clock T-TSC is decreased. If $T2_2-T2_1$ is less than $T1_2-T1_1$, the frequency of the virtual clock T-TSC is increased. A frequency adjustment method may be determined according to a PID control method. For example, the PID control method may be used to determine a frequency control word $F_{2\_1}$, and the frequency control word is used to adjust the frequency of the virtual clock T-TSC. A specific process for determining the frequency control word is not described herein.

In FIG. 5, the frequency control word is determined by using two forward delays. In some other embodiments, the frequency control word may alternatively be determined by using two reverse delays. A determining process is opposite to the manner shown in FIG. 5. For example, a timestamp of the virtual clock T-TSC is obtained as $T3_1$. Then, after a reverse delay 1 elapses with $T3_1$ as a starting moment, a current timestamp of the virtual clock T-GM is recorded as $T4_1$. A timestamp of the virtual clock T-TSC is obtained as $T3_2$. Then, after a reverse delay 2 elapses with $T3_2$ as a starting moment, a current timestamp of the virtual clock T-GM is recorded as $T4_2$. The frequency control word is generated based on $T3_1$, $T3_2$, $T4_1$, and $T4_2$.

In some other embodiments, a manner of determining the frequency control word may be alternatively determined by using more than two forward delays or more than two reverse delays. A specific determining manner is similar to a manner of determining by using two forward delays or two reverse delays. For brevity, details are not described herein.

As described above, the delay information collected by the T-TSC may be a forward delay or a reverse delay. In this case, the frequency control word may be directly determined by using the collected forward delay or the collected reverse delay. If a group of information in the delay information collected by the T-TSC is four timestamps, a forward delay or a reverse delay may be first determined based on the collected four timestamps, and then the frequency control word is determined by using the determined delay.

Figure 6:
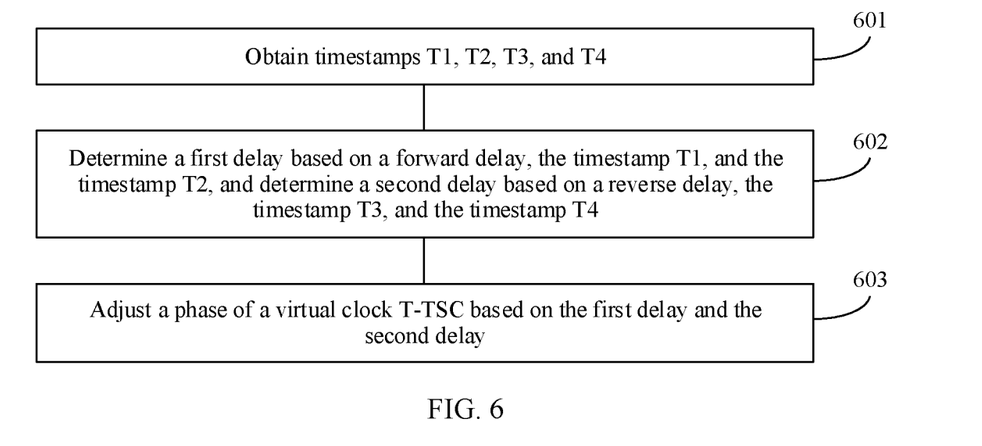
FIG. 6 is a schematic flowchart of adjusting a phase of a virtual clock T-TSC according to an embodiment of this application.
Figure 7:
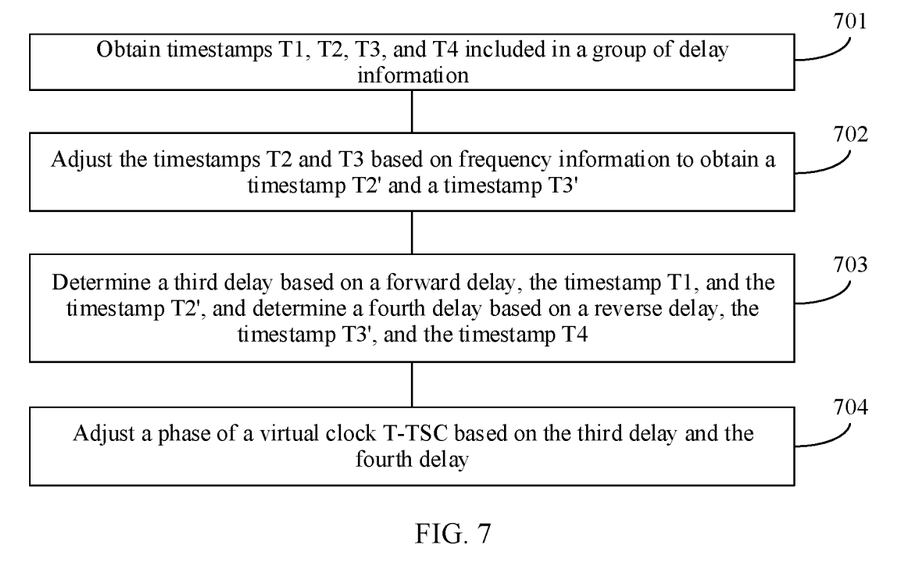
FIG. 7 is another schematic flowchart of adjusting a phase of a virtual clock T-TSC according to an embodiment of this application.

The following briefly describes how to adjust a phase of the virtual clock T-TSC with reference to FIG. 6 and FIG. 7.

FIG. 6 is a schematic flowchart of adjusting a phase of a virtual clock T-TSC according to an embodiment of this application.

Step 601: Obtain timestamps T1, T2, T3, and T4.

In some embodiments, the timestamps T1 and T4 are generated by the virtual clock T-GM and the timestamps T2 and T3 are generated by the virtual clock T-TSC. For example, the timestamp T1 generated by the virtual clock T-GM is obtained. Then, after 1 message sending interval elapses, the timestamp T2 generated by the virtual clock T-TSC is recorded. After a preset time interval elapses, the timestamp T3 generated by the virtual clock T-TSC is recorded. Then, after 1 message sending interval elapses, the timestamp T4 generated by the virtual clock T-GM is recorded.

In some other embodiments, the virtual clock T-GM may generate timestamps T1, T2', T3', and T4, and then superpose a collected clock source noise on T2' and T3' to obtain timestamps T2 and T3.

Step 602: Determine a first delay based on a forward delay, the timestamp T1, and the timestamp T2, and determine a second delay based on a reverse delay, the timestamp T3, and the timestamp T4.

The first delay may be determined according to the following formula:

$$D_1=D_f+(T_2-T_1), \qquad \text{(Formula 6.1)}$$

$D_1$ is the first delay, $D_f$ is the forward delay, $T_1$ is the timestamp T1, and $T_2$ is the timestamp T2.

The second delay may be determined according to the following formula:

$$D_2=D_b+(T_4-T_3), \qquad \text{(Formula 6.2)}$$

$D_2$ is the second delay, $D_b$ is the reverse delay, $T_3$ is the timestamp T3, and $T_4$ is the timestamp T4.

The forward delay and the reverse delay in Formula 6.1 and Formula 6.2 may be the forward delay and the reverse delay included in the delay information. In other words, the delay information collected by the T-TSC is the forward delay and the reverse delay. In some other embodiments, the forward delay and reverse delay in Formula 6.1 and Formula 6.2 are calculated based on the four timestamps collected by T-TSC.

Step 603: Adjust the phase of the virtual clock T-TSC based on the first delay and the second delay.

Optionally, a phase adjustment parameter may be determined according to the following formula:

$$T_{Offset}=(D_1-D_2)/2, \qquad \text{(Formula 6.3)}$$

$T_{Offset}$ represents the phase adjustment parameter, $D_1$ represents the first delay, and $D_2$ represents the second delay. After the phase adjustment parameter is determined, the phase adjustment parameter may be superposed on a phase of the clock signal generated by the virtual clock T-TSC.

FIG. 7 is another schematic flowchart of adjusting a phase of a virtual clock T-TSC according to an embodiment of this application. In the embodiment shown in FIG. 7, it is assumed that the delay information collected by the T-TSC is four timestamps instead of the forward delay and the reverse delay.

Step 701: Obtain timestamps T1, T2, T3, and T4 included in the delay information.

Step 702: Adjust the timestamps T2 and T3 based on the frequency information to obtain a timestamp T2' and a timestamp T3'.

Based on the frequency information, adjusting the timestamps T2 and T3 may include: superposing, on the timestamp T2, the clock source noise corresponding to the frequency information, to obtain the timestamp T2', and superposing, on the timestamp T3, the clock source noise corresponding to the frequency information to obtain the timestamp T3'.

Step 703: Determine a third delay based on the forward delay, the timestamp T1, and the timestamp T2', and determine a fourth delay based on the reverse delay, the timestamp T3', and the timestamp T4.

The third delay may be determined according to the following formula:

$$D_3 = T_{2'} - T_1, \quad \text{(Formula 7.1)}$$

$D_3$ is the third delay, $T_1$ is the timestamp T1, and $T_{2'}$ is the timestamp T2'.

The fourth delay may be determined according to the following formula:

$$D_4 = T_4 - T_{3'}, \quad \text{(Formula 7.2)}$$

$D_4$ is the fourth delay, $T_{3'}$ is the timestamp T3', and $T_4$ is the timestamp T4.

Step 704: Adjust the phase of the virtual clock T-TSC based on the third delay and the fourth delay.

Optionally, a phase adjustment parameter may be determined according to the following formula:

$$T_{Offset} = (D_3 - D_4)/2, \quad \text{(Formula 7.3)}$$

$T_{Offset}$ represents the phase adjustment parameter, $D_3$ represents the third delay, and $D_4$ represents the fourth delay. After the phase adjustment parameter is determined, the phase adjustment parameter may be superposed on a phase of the clock signal generated by the virtual clock T-TSC.

In a process shown in FIG. 7, the third delay and the fourth delay need to be first determined based on T1, T2', T3', and T4, and then the phase adjustment parameter is determined. In some other embodiments, the phase adjustment parameter may be determined directly based on T1, T2', T3' and T4. For example, the phase adjustment parameter may be determined according to Formula 7.4.

Optionally, a phase adjustment parameter may be determined according to the following formula:

$$T_{Offset} = [(T_2 - T_1) - (T_4 - T_{3'})]/2, \quad \text{(Formula 7.4)}$$

$T_{Offset}$ represents the phase adjustment parameter, $T_1$ is the timestamp T1, $T_{2'}$ is the timestamp T2', $T_{3'}$ is the timestamp T3', and $T_4$ is the timestamp T4.

It may be understood that, the delay information in FIG. 6 and FIG. 7 that is used to adjust the phase is a forward delay, a reverse delay, or a timestamp included in a same group of delay information.

After the virtual clock T-TSC is adjusted, clock performance evaluation information may be determined based on the virtual clock T-GM and an adjusted virtual clock T-TSC. The clock information evaluation information is used to indicate clock time recovery performance of the virtual clock T-TSC.

For example, the clock performance evaluation information may include one or more of a time interval error (TIE) and a time error (TE). The clock performance evaluation information may further include one or more of a maximum time interval error (MTIE), a time deviation (TDEV), a maximum absolute time error (max|TE|), or the like.

For example, a frequency $F_{v1}$ of the virtual clock T-GM and a frequency $F_{v2}$ of the adjusted virtual clock T-TSC may be determined. A TIE is determined based on $F_{v1}$ and $F_{v2}$.

In another example, timestamps $T_{v1}$ and $T_{v4}$ generated by the virtual clock T-GM may be determined, and timestamps $T_{v2}$ and $T_{v3}$ generated by the adjusted virtual clock T-TSC may be determined. A TE is determined based on $T_{v1}$, $T_{v2}$, $T_{v3}$, and $T_{v4}$.

$T_{v1}$, $T_{v2}$, $T_{v3}$, and $T_{v4}$ may be obtained in the following manner: The timestamp $T_{v1}$ generated by the virtual clock T-GM is obtained. Then, after l message sending interval (where l is a positive integer greater than or equal to 1) elapses, the timestamp $T_{v2}$ generated by the virtual clock T-TSC is recorded. After a preset time interval elapses, the timestamp $T_{v3}$ generated by the virtual clock T-TSC is recorded. Then, after l message sending interval elapses, the timestamp $T_{v4}$ generated by the virtual clock T-GM is recorded.

An MTIE, a TDEV, and a Max|TE| may be determined based on TEs and TIEs obtained through statistic collection within a period of time. For example, the MTIE is a maximum value of the TIEs obtained through statistic collection within a period of time, and the Max|TE| is a maximum value of the TEs obtained through statistic collection within a period of time.

The determined clock performance evaluation information may be sent to a computer device. An administrator may obtain the clock performance evaluation information by using the computer device.

In this embodiment of this application, the delay information and a clock source noise of a T-TSC device may be collected when the reference clock operates normally. A clock of the T-TSC is simulated by using the collected delay information and the collected clock source noise. The simulated clock of the T-TSC may be used to estimate PTP message synchronization performance of the T-TSC. Therefore, the PTP message synchronization performance of the T-TSC can be pre-determined before a GNSS fails, to guide network operation and maintenance activities. By using a technical solution in this embodiment of this application, delay information for several days can be collected, and clock time recovery performance of the T-TSC can be evaluated by using the collected delay information in a short time (for example, a few minutes). In an entire process, an evaluation result can be output automatically without exporting collected data. This reduces participation of operation and maintenance personnel, and reduces evaluation costs.

A type of a clock source is not limited in this embodiment of this application. For example, the type of the clock source may include a crystal oscillator, a rubidium clock, or another type of oscillator.

Further, message synchronization performance evaluation of the T-TSC is implemented by using the virtual clock. The clock signal generated is used to evaluate the message synchronization performance of the T-TSC. Therefore, normal operation of the T-TSC is not affected.

The method shown in FIG. 4 to FIG. 7 may be implemented by another computer apparatus in addition to the network device (for example, the T-TSC or a T-BC serving as a slave device) serving as a slave device or a component in the network device. For example, the method may be implemented by another computer device (for example, a computer device (which may be a personal computer, a server, or the like) serving as a management device) or a component in the computer device. The network device serving as a slave device collects the delay information and the frequency information that is of the actual clock of the slave device, and sends the collected information to the computer device. The computer device determines the virtual clock T-TSC and the virtual clock T-GM based on the obtained information, and evaluates the clock time recovery performance of the slave device by using the determined virtual clock T-TSC.

Figure 8:
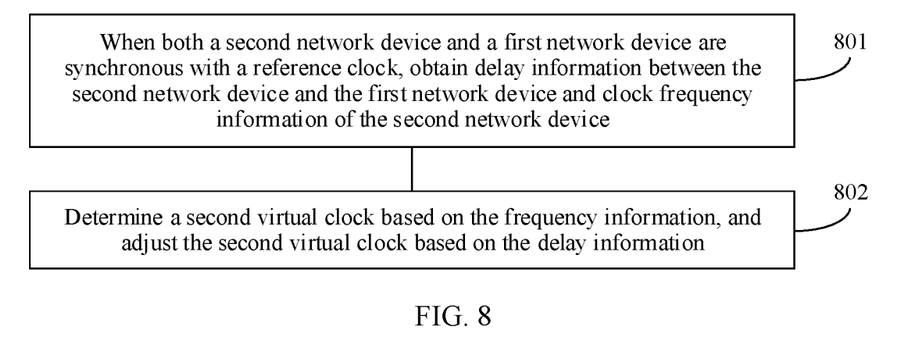
FIG. 8 is a schematic flowchart of a clock determining method according to this application.

FIG. 8 is a schematic flowchart of a clock determining method according to this application. The method shown in FIG. 8 may be performed by a network device serving as a slave device or a component (for example, a chip or a circuit) in the network device, or may be performed by a computer device (for example, a computer device serving as a management device) or a component (for example, a chip or a circuit) in the computer device.

801: When both a second network device and a first network device are synchronous with a reference clock, obtain delay information between the second network device and the first network device and clock frequency information of the second network device.

802: Determine a second virtual clock based on the frequency information; and adjust the second virtual clock based on the delay information, where an adjusted second virtual clock is synchronized with a first virtual clock, and the first virtual clock is used to simulate a clock of the first network device.

The second network device may be a network device performing the method shown in FIG. 8.

Optionally, the delay information includes N delays, and the N delays are N delays from the second network device to the first network device, or N delays from the first network device to the second network device, where N is a positive integer greater than or equal to 2. The method further includes: obtaining N first timestamps generated by the first virtual clock. Adjusting the second virtual clock based on the delay information includes: obtaining, based on the N delays and the N first timestamps, N second timestamps generated by the second virtual clock, where the N second timestamps are in a one-to-one correspondence with the N delays; and adjusting a frequency of the second virtual clock based on the N second timestamps and the N first timestamps.

Optionally, the delay information includes a forward delay and a reverse delay, where the forward delay is a delay from the first network device to the second network device, and the reverse delay is a delay from the second network device to the first network device. The method further includes: obtaining a third timestamp and a sixth timestamp generated by the first virtual clock; and obtaining a fourth timestamp and a fifth timestamp generated by the second virtual clock. Adjusting the second virtual clock based on the delay information includes: determining a first delay based on the forward delay, the third timestamp, and the fourth timestamp; determining a second delay based on the reverse delay, the fifth timestamp, and the sixth timestamp; and adjusting a phase of the second virtual clock based on the first delay and the second delay.

Optionally, the delay information includes a seventh timestamp, an eighth timestamp, a ninth timestamp, and a tenth timestamp. Adjusting the second virtual clock based on the delay information includes: adjusting the eighth timestamp and the ninth timestamp based on the frequency information; and adjusting a phase of the second virtual clock based on the seventh timestamp, an adjusted eighth timestamp, an adjusted ninth timestamp, and the tenth timestamp.

Optionally, the method further includes: determining clock performance evaluation information based on the first virtual clock and the adjusted second virtual clock, where the clock performance evaluation information is used to indicate clock time recovery performance of the second virtual clock.

Optionally, determining the clock performance evaluation information based on the first virtual clock and the adjusted second virtual clock includes: determining a frequency $F_{v1}$ of the first virtual clock and a frequency $F_{v2}$ of the adjusted second virtual clock; and determining a time interval error TIE based on $F_{v1}$ and $F_{v2}$.

Optionally, determining the clock performance evaluation information based on the first virtual clock and the adjusted second virtual clock includes: determining timestamps $T_{v1}$ and $T_{v4}$ generated by the first virtual clock; determining timestamps $T_{v2}$ and $T_{v3}$ generated by the adjusted second virtual clock; and determining a time error TE based on $T_{v1}$, $T_{v2}$, $T_{v3}$, and $T_{v4}$.

Figure 9:
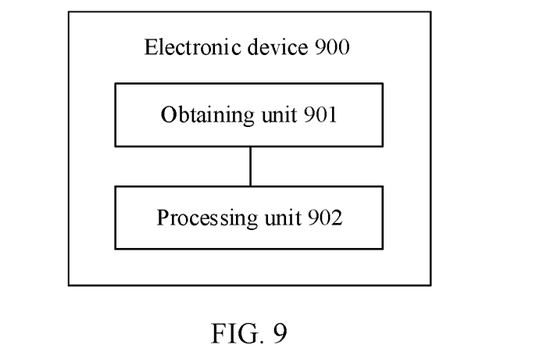
FIG. 9 is a schematic block diagram of a structure of an electronic device according to an embodiment of this application.

FIG. 9 is a schematic block diagram of a structure of an electronic device according to an embodiment of this application. An electronic device 900 shown in FIG. 9 includes an obtaining unit 901 and a processing unit 902. The electronic device 900 may perform steps in the foregoing method embodiments. The electronic device 900 may be a network device, or may be a computer device.

The obtaining unit 901 is configured to: when both a second network device and a first network device are synchronous with a reference clock, obtain delay information between the second network device and the first network device and clock frequency information of the second network device.

The processing unit 902 may be configured to determine a second virtual clock based on the frequency information.

The processing unit 902 is further configured to adjust the second virtual clock based on the delay information, where an adjusted second virtual clock is synchronized with a first virtual clock, and the first virtual clock is used to simulate a clock of the first network device.

In some embodiments, the delay information includes N delays, and the N delays are N delays from the second network device to the first network device, or N delays from the first network device to the second network device, where N is a positive integer greater than or equal to 2. The obtaining unit 901 is further configured to obtain N first timestamps generated by the first virtual clock. The processing unit 902 is specifically configured to obtain, based on the N delays and the N first timestamps, N second timestamps generated by the second virtual clock, where the N second timestamps are in a one-to-one correspondence with the N delays; and adjust a frequency of the second virtual clock based on the N second timestamps and the N first timestamps.

In some embodiments, the delay information includes a forward delay and a reverse delay, where the forward delay is a delay from the first network device to the second network device, and the reverse delay is a delay from the second network device to the first network device. The obtaining unit 901 is further configured to obtain a third timestamp and a sixth timestamp generated by the first virtual clock; and obtain a fourth timestamp and a fifth timestamp generated by the second virtual clock. The processing unit 902 is specifically configured to determine a first delay based on the forward delay, the third timestamp, and the fourth timestamp; determine a second delay based on the reverse delay, the fifth timestamp, and the sixth timestamp; and adjust a phase of the second virtual clock based on the first delay and the second delay.

In some embodiments, the delay information includes a seventh timestamp, an eighth timestamp, a ninth timestamp, and a tenth timestamp. The processing unit 902 is specifically configured to adjust the eighth timestamp and the ninth timestamp based on the frequency information; and adjust a phase of the second virtual clock based on the seventh timestamp, an adjusted eighth timestamp, an adjusted ninth timestamp, and the tenth timestamp.

In some embodiments, the processing unit 902 is further configured to determine clock performance evaluation information based on the first virtual clock and the adjusted second virtual clock, where the clock performance evaluation information is used to indicate clock time recovery performance of the second virtual clock.

In some embodiments, the processing unit 902 is specifically configured to determine a frequency $F_{v1}$ of the first virtual clock and a frequency $F_{v2}$ of the adjusted second virtual clock; and determine a time interval error TIE based on $F_{v1}$ and $F_{v2}$.

In some embodiments, the processing unit 902 is specifically configured to determine timestamps $T_{v1}$ and $T_{v4}$ generated by the first virtual clock; determine timestamps $T_{v2}$ and $T_{v3}$ generated by the adjusted second virtual clock; and determine a time error TE based on $T_{v1}$, $T_{v2}$, $T_{v3}$, and $T_{v4}$.

If the electronic device 900 is the second network device, the obtaining unit 901 may be a communication interface in the network device, and the processing unit 902 may be a processor of the network device.

If the electronic device 900 is a computer device, the obtaining unit 901 may be a receiver, where the receiver may be configured to receive related information (such as the delay information and the frequency information) from the second network device, and the processing unit 902 may be a processor of the computer device.

It should be understood that, the electronic device 900 may alternatively be a chip. For example, the electronic device may be a field programmable gate array (FPGA), may be an application specific integrated circuit (ASIC), may be a system on chip (SoC), may be a central processing unit (CPU), may be a network processor (NP), may be a digital signal processor (DSP), may be a micro controller unit (MCU), may be a programmable logic device (PLD), another programmable logic device, a discrete gate or a transistor logic device, a discrete hardware component, or another integrated chip.

If the electronic apparatus 900 is a chip, the obtaining unit 901 may be an input/output circuit or a communication interface, and the processing unit 902 may be a processor integrated on the chip or an integrated circuit.

An embodiment of this application further provides an electronic device, where the electronic device includes a processor. The processor is configured to be coupled to a memory, read and execute instructions and/or program code in the memory, so as to perform a method in any one of the foregoing embodiments.

An embodiment of this application further provides a system on chip, where the system on chip includes a logic circuit. The logic circuit is configured to be coupled to an input/output interface, and transmit data through the input/output interface, so as to perform a method in any one of the foregoing embodiments.

In an implementation process, the steps in the foregoing methods may be completed by using a hardware integrated logic circuit in the processor, or by using instructions or program code in a form of software. The steps of the method disclosed with reference to embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, a processor in embodiments of this application may be an integrated circuit chip, and has a signal processing capability. In an implementation process, steps in the foregoing method embodiments may be completed by using a hardware integrated logic circuit in the processor, or by using instructions or program code in a form of software. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

According to methods provided in embodiments of this application, this application further provides a computer program product. The computer program product includes computer program code. When the computer program code is run on a computer, the computer is enabled to perform the method in any one of the foregoing embodiments.

According to methods provided in embodiments of this application, this application further provides a computer-readable medium, where the computer-readable medium stores program code. When the program code is run on a computer, the computer is enabled to perform the method in any one of the foregoing embodiments.

According to methods provided in embodiments of this application, this application further provides a system, including the foregoing second network device and the foregoing first network device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of respective technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, technical solutions of this application may be implemented in a form of a software product. The computer software product is stored in a storage medium and includes several instructions or program code for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application may fall within the protection scope of this application.

What is claimed is:

1. A clock determining method, comprising:
   while both a first network device and a second network device are synchronous with different reference clocks, obtaining, by the second network device, (A) delay information regarding a delay between the second network device and the first network device and (B) clock frequency information of the second network device, wherein the first network device is serving as a master device and the second network device is serving as a slave device;
   determining, by the second network device, a second virtual clock based on the clock frequency information of the second network device, wherein the second virtual clock simulates a clock of the second network device;
   adjusting, by the second network device, the second virtual clock based on the delay information, wherein the adjusted second virtual clock is synchronized with a first virtual clock which simulates a clock of the first network device; and
   determining, by the second network device, clock performance evaluation information based on the first virtual clock and the adjusted second virtual clock, wherein the clock performance evaluation information indicates clock time recovery performance of the second virtual clock.

2. The method according to claim 1, wherein the delay information comprises N delays, and the N delays are N delays from the second network device to the first network device or N delays from the first network device to the second network device, wherein N is a positive integer greater than or equal to 2;
   wherein the method further comprises: obtaining N first timestamps generated by the first virtual clock; and
   wherein adjusting the second virtual clock based on the delay information comprises:
      obtaining, based on the N delays and the N first timestamps, N second timestamps generated by the second virtual clock, wherein the N second timestamps are in a one-to-one correspondence with the N delays; and
      adjusting a frequency of the second virtual clock based on the N second timestamps and the N first timestamps.

3. The method according to claim 1, wherein the delay information comprises a forward delay and a reverse delay, wherein the forward delay is a delay from the first network device to the second network device, and the reverse delay is a delay from the second network device to the first network device;
   wherein the method further comprises:
      obtaining a third timestamp and a sixth timestamp generated by the first virtual clock; and
      obtaining a fourth timestamp and a fifth timestamp generated by the second virtual clock; and
   wherein adjusting the second virtual clock based on the delay information comprises:
      determining a first delay based on the forward delay, the third timestamp, and the fourth timestamp;
      determining a second delay based on the reverse delay, the fifth timestamp, and the sixth timestamp; and
      adjusting a phase of the second virtual clock based on the first delay and the second delay.

4. The method according to claim 1, wherein the delay information comprises a seventh timestamp, an eighth timestamp, a ninth timestamp, and a tenth timestamp; and
wherein adjusting the second virtual clock based on the delay information comprises:
adjusting the eighth timestamp and the ninth timestamp based on the clock frequency information; and
adjusting a phase of the second virtual clock based on the seventh timestamp, the adjusted eighth timestamp, the adjusted ninth timestamp, and the tenth timestamp.

5. The method according to claim 1, wherein determining the clock performance evaluation information based on the first virtual clock and the adjusted second virtual clock comprises:
determining a frequency $F_{v1}$ of the first virtual clock and a frequency $F_{v2}$ of the adjusted second virtual clock; and
determining a time interval error (TIE) based on $F_{v1}$ and $F_{v2}$.

6. The method according to claim 1, wherein determining the clock performance evaluation information based on the first virtual clock and the adjusted second virtual clock comprises:
determining timestamps $T_{v1}$ and $T_{v4}$ generated by the first virtual clock;
determining timestamps $T_{v2}$ and $T_{v3}$ generated by the adjusted second virtual clock; and
determining a time error (TE) based on $T_{v1}$, $T_{v2}$, $T_{v3}$, and $T_{v4}$.

7. A second network device, comprising:
a processor; and
a memory;
wherein the processor is configured to execute instructions and/or program code in the memory to facilitate performance of the following by the second network device:
while both a first network device and the second network device are synchronous with different reference clocks, obtaining (A) delay information between the second network device and the first network device and (B) clock frequency information of the second network device, wherein the first network device is serving as a master device and the second network device is serving as a slave device;
determining a second virtual clock based on the clock frequency information of the second network device, wherein the second virtual clock simulates a clock of the second network device;
adjusting the second virtual clock based on the delay information, wherein the adjusted second virtual clock is synchronized with a first virtual clock which simulates a clock of the first network device; and
determining clock performance evaluation information based on the first virtual clock and the adjusted second virtual clock, wherein the clock performance evaluation information indicates clock time recovery performance of the second virtual clock.

8. The second network device according to claim 7, wherein the delay information comprises N delays, and the N delays are N delays from the first network device to the second network device or N delays from the second network electronic device to the first network another-device, wherein N is a positive integer greater than or equal to 2;
wherein the processor is further configured to execute instructions and/or program code in the memory to facilitate performance of the following by the second network device: obtaining N first timestamps generated by the first virtual clock; and
wherein adjusting the second virtual clock based on the delay information comprises:
obtaining, based on the N delays and the N first timestamps, N second timestamps generated by the second virtual clock, wherein the N second timestamps are in a one-to-one correspondence with the N delays; and
adjusting a frequency of the second virtual clock based on the N second timestamps and the N first timestamps.

9. The second network device according to claim 7, wherein the delay information comprises a forward delay and a reverse delay, wherein the forward delay is a delay from the second network device to the first network device, and the reverse delay is a delay from the first network device to the second network device;
wherein the processor is further configured to execute instructions and/or program code in the memory to facilitate performance of the following by the second network device:
obtaining a third timestamp and a sixth timestamp generated by the first virtual clock; and
obtaining a fourth timestamp and a fifth timestamp generated by the second virtual clock; and
wherein adjusting the second virtual clock based on the delay information comprises:
determining a first delay based on the forward delay, the third timestamp, and the fourth timestamp;
determining a second delay based on the reverse delay, the fifth timestamp, and the sixth timestamp; and
adjusting a phase of the second virtual clock based on the first delay and the second delay.

10. The second network device according to claim 7, wherein the delay information comprises a seventh timestamp, an eighth timestamp, a ninth timestamp, and a tenth timestamp; and
wherein adjusting the second virtual clock based on the delay information comprises:
adjusting the eighth timestamp and the ninth timestamp based on the clock frequency information; and
adjusting a phase of the second virtual clock based on the seventh timestamp, the adjusted eighth timestamp, the adjusted ninth timestamp, and the tenth timestamp.

11. The second network device according to claim 7, wherein determining the clock performance evaluation information based on the first virtual clock and the adjusted second virtual clock comprises:
determining a frequency Fv of the first virtual clock and a frequency $F_{v2}$ of the adjusted second virtual clock; and
determining a time interval error (TIE) based on $F_{v1}$ and $F_{v2}$.

12. The second network device according to claim 7, wherein determining the clock performance evaluation information based on the first virtual clock and the adjusted second virtual clock comprises:
determining timestamps $T_{v1}$ and $T_{v4}$ generated by the first virtual clock;
determining timestamps $T_{v2}$ and $T_{v3}$ generated by the adjusted second virtual clock; and
determining a time error (TE) based on $T_{v1}$, $T_{v2}$, $T_{v3}$, and $T_{v4}$.

13. The second network device according to claim 7, wherein the second network device is in a chip.

14. A non-transitory computer-readable medium having executable instructions stored thereon for a clock determining method, wherein the executable instructions, when executed, facilitate:
while both a first network device and a second network device are synchronous with different reference clocks, obtaining, by the second network device, (A) delay information between the second network device and the first network device and (B) clock frequency information of the second network device, wherein the first network device is serving as a master device and the second network device is serving as a slave device;
determining, by the second network device, a second virtual clock based on the clock frequency information of the second network device, wherein the second virtual clock simulates a clock of the second network device;
adjusting, by the second network device, the second virtual clock based on the delay information, wherein the adjusted second virtual clock is synchronized with a first virtual clock which simulates a clock of the first network device; and
determining, by the second network device, clock performance evaluation information based on the first virtual clock and the adjusted second virtual clock, wherein the clock performance evaluation information indicates clock time recovery performance of the second virtual clock.

15. The non-transitory computer-readable medium according to claim 14, wherein the delay information comprises N delays, and the N delays are N delays from the second network device to the first network device or N delays from the first network device to the second network device, wherein N is a positive integer greater than or equal to 2;
wherein the executable instructions, when executed, further facilitate: obtaining N first timestamps generated by the first virtual clock;
wherein adjusting the second virtual clock based on the delay information comprises:
obtaining, based on the N delays and the N first timestamps, N second timestamps generated by the second virtual clock, wherein the N second timestamps are in a one-to-one correspondence with the N delays; and
adjusting a frequency of the second virtual clock based on the N second timestamps and the N first timestamps.

16. The non-transitory computer-readable medium according to claim 14, wherein the delay information comprises a forward delay and a reverse delay, wherein the forward delay is a delay from the first network device to the second network device, and the reverse delay is a delay from the second network device to the first network device;
wherein the executable instructions, when executed, further facilitate:
obtaining a third timestamp and a sixth timestamp generated by the first virtual clock;
obtaining a fourth timestamp and a fifth timestamp generated by the second virtual clock;
wherein adjusting the second virtual clock based on the delay information comprises:
determining a first delay based on the forward delay, the third timestamp, and the fourth timestamp;
determining a second delay based on the reverse delay, the fifth timestamp, and the sixth timestamp; and
adjusting a phase of the second virtual clock based on the first delay and the second delay.

17. The non-transitory computer-readable medium according to claim 14, wherein the delay information comprises a seventh timestamp, an eighth timestamp, a ninth timestamp, and a tenth timestamp;
wherein adjusting the second virtual clock based on the delay information comprises:
adjusting the eighth timestamp and the ninth timestamp based on the clock frequency information; and
adjusting a phase of the second virtual clock based on the seventh timestamp, the adjusted eighth timestamp, the adjusted ninth timestamp, and the tenth timestamp.

18. The non-transitory computer-readable medium according to claim 14, wherein determining the clock performance evaluation information based on the first virtual clock and the adjusted second virtual clock comprises:
determining a frequency $F_{v1}$ of the first virtual clock and a frequency $F_{v2}$ of the adjusted second virtual clock; and
determining a time interval error (TIE) based on $F_{v1}$ and $F_{v2}$.

19. The non-transitory computer-readable medium according to claim 14, wherein determining the clock performance evaluation information based on the first virtual clock and the adjusted second virtual clock comprises:
determining timestamps $T_{v1}$ and $T_{v4}$ generated by the first virtual clock;
determining timestamps $T_{v2}$ and $T_{v3}$ generated by the adjusted second virtual clock; and
determining a time error (TE) based on $T_{v1}$, $T_{v2}$, $T_{v3}$, and $T_{v4}$.

20. The non-transitory computer-readable medium according to claim 14, wherein the second network device is in a chip.

* * * * *